(12) United States Patent
Saeidi et al.

(10) Patent No.: US 10,061,331 B2
(45) Date of Patent: Aug. 28, 2018

(54) SYSTEMS AND METHODS FOR DETECTING THERMAL RUNAWAY

(71) Applicant: QUALCOMM Incorporated, San Diego, CA (US)

(72) Inventors: Mehdi Saeidi, San Diego, CA (US); Rajat Mittal, San Diego, CA (US); Arpit Mittal, San Diego, CA (US); Ryan Michael Coutts, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 14/603,058

(22) Filed: Jan. 22, 2015

(65) Prior Publication Data

US 2016/0216719 A1   Jul. 28, 2016

(51) Int. Cl.
| | | |
|---|---|---|
| *G05D 23/00* | (2006.01) | |
| *G06F 1/32* | (2006.01) | |
| *G05D 23/19* | (2006.01) | |
| *G01K 3/08* | (2006.01) | |
| *G06F 1/20* | (2006.01) | |
| *G05B 15/02* | (2006.01) | |
| *G01K 3/10* | (2006.01) | |

(52) U.S. Cl.
CPC ........... *G05D 23/1917* (2013.01); *G01K 3/08* (2013.01); *G01K 3/10* (2013.01); *G05B 15/02* (2013.01); *G06F 1/206* (2013.01)

(58) Field of Classification Search
CPC ...................................................... G06F 1/206
USPC ........................................................ 700/299
See application file for complete search history.

(56) References Cited

U.S. PATENT DOCUMENTS

| | | | | | |
|---|---|---|---|---|---|
| 4,392,101 | A | * | 7/1983 | Saar ...................... | H01M 10/44 320/125 |
| 4,503,378 | A | * | 3/1985 | Jones .................... | H02J 7/0081 320/161 |
| 4,755,735 | A | * | 7/1988 | Inakagata ............. | H02J 7/0091 320/150 |
| 5,249,866 | A | * | 10/1993 | Dube .................... | G01F 23/246 374/163 |
| 5,519,303 | A | | 5/1996 | Goedken et al. | |
| 5,895,596 | A | | 4/1999 | Stoddard et al. | |
| (Continued) | | | | | |

FOREIGN PATENT DOCUMENTS

| | | |
|---|---|---|
| EP | 0882499 A1 | 12/1998 |
| EP | 2672291 A1 | 12/2013 |
| WO | WO-0070316 A1 | 11/2000 |

OTHER PUBLICATIONS

Kalra et al, "Automation of Autoclave Cure of Epoxy/Graphite Composites" chapter in Book titled "Search of Excellence, ANTEC 91", May 1, 1991, CRC Press, pages inclueded here 5.*

(Continued)

*Primary Examiner* — Suresh Suryawanshi
(74) *Attorney, Agent, or Firm* — Loza & Loza LLP

(57) ABSTRACT

In one embodiment, a method of temperature control comprises receiving temperature readings from a temperature sensor on a chip, calculating one or more second derivatives of temperature with respect to time based on the temperature readings, and determining whether to perform temperature mitigation on the chip based on the one or more calculated second derivatives of temperature.

20 Claims, 12 Drawing Sheets

(56) References Cited

U.S. PATENT DOCUMENTS

| | | | | |
|---|---|---|---|---|
| 6,091,255 A * | 7/2000 | Godfrey | .................. | G01K 1/02 |
| | | | | 324/750.06 |
| 6,172,487 B1 * | 1/2001 | Brotto | ................... | H02J 7/0091 |
| | | | | 320/137 |
| 6,195,010 B1 * | 2/2001 | Zaldivar | ............... | B01J 19/002 |
| | | | | 340/588 |
| 6,211,655 B1 * | 4/2001 | Hardie | ................. | H02J 7/0091 |
| | | | | 320/150 |
| 6,270,252 B1 * | 8/2001 | Siefert | .................... | G01K 7/42 |
| | | | | 374/102 |
| 6,714,890 B2 * | 3/2004 | Dai | ........................ | G06F 1/206 |
| | | | | 702/132 |
| 6,783,080 B2 * | 8/2004 | Antoniou | ........... | G05D 23/1917 |
| | | | | 236/12.12 |
| 7,451,332 B2 | 11/2008 | Culbert et al. | | |
| 7,467,318 B2 * | 12/2008 | Bruno | ..................... | G06F 1/206 |
| | | | | 713/322 |
| 7,557,328 B2 * | 7/2009 | Ohata | ................ | G05D 23/1917 |
| | | | | 118/725 |
| 7,920,032 B2 * | 4/2011 | Makinwa | ................ | H03B 17/00 |
| | | | | 331/175 |
| 8,197,128 B2 * | 6/2012 | Zhang | .................... | G01K 7/42 |
| | | | | 374/102 |
| 8,380,455 B1 * | 2/2013 | Butsenko | ................ | G01K 7/42 |
| | | | | 374/103 |
| 2010/0073068 A1 | 3/2010 | Cho et al. | | |
| 2011/0119018 A1 * | 5/2011 | Skarp | ...................... | G01K 7/42 |
| | | | | 702/130 |
| 2011/0316545 A1 | 12/2011 | Grant et al. | | |
| 2012/0271481 A1 * | 10/2012 | Anderson | ............... | G06F 1/206 |
| | | | | 700/299 |
| 2014/0006818 A1 | 1/2014 | Doshi et al. | | |
| 2015/0046729 A1 * | 2/2015 | Fukuoka | ................ | G06F 13/24 |
| | | | | 713/320 |
| 2015/0073611 A1 * | 3/2015 | Jain | ..................... | G01R 31/025 |
| | | | | 700/291 |
| 2015/0355033 A1 * | 12/2015 | Zhang | .................... | G01K 13/00 |
| | | | | 374/170 |
| 2016/0119018 A1 * | 4/2016 | Lindgren | ............. | H04B 7/0613 |
| | | | | 375/219 |
| 2016/0146492 A1 * | 5/2016 | Tomomatsu | ......... | F24F 11/0012 |
| | | | | 700/276 |
| 2017/0157613 A1 * | 6/2017 | Li | ............................. | B01L 7/52 |

OTHER PUBLICATIONS

Stout, Predicting Thermal Runaway, Apr. 2006, pp. 14.*
Ziabari et al, Fast Thermal Simulators for Architecture Level Integrated Circuit Design, 2011, IEEE, pp. 6.*
Henda, Transient Runaway in a Fixed-Bed Catalytic Reactor, Jun. 1, 2008, INTECH, pp. 12.*
International Search Report and Written Opinion—PCT/US2015/065535—ISA/EPO—Mar. 24, 2016.

\* cited by examiner

SYSTEMS AND METHODS FOR DETECTING THERMAL RUNAWAY

BACKGROUND

Field

Aspects of the present disclosure relate generally to temperature sensing, and more particularly, to detecting thermal runaway.

Background

Temperature sensors may be integrated on a chip to monitor temperature at various locations on the chip. Temperature readings from the sensors may be fed to a temperature manager that manages circuits (e.g., central processing unit (CPU)) on the chip based on the temperature readings. For example, the temperature manager may manage the circuits based on the temperature readings to prevent thermal runaway. Thermal runaway occurs when increases in temperature cause increases in leakage power, which, in turn, cause further increases in temperature. This positive feedback can cause the temperature of the chip to rapidly rise, potentially damaging the circuit.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to a first aspect, a temperature management system is provided. The system comprises a calculation module configured to calculate one or more second derivatives of temperature with respect to time based on temperature readings from a temperature sensor on a chip. The system also comprises a temperature control module configured to determine whether to perform temperature mitigation on the chip based on the one or more calculated second derivatives of temperature.

A second aspect relates to a method of temperature control. The method comprises receiving temperature readings from a temperature sensor on a chip, calculating one or more second derivatives of temperature with respect to time based on the temperature readings, and determining whether to perform temperature mitigation on the chip based on the one or more calculated second derivatives of temperature.

A third aspect relates to an apparatus. The apparatus comprises means for receiving temperature readings from a temperature sensor on a chip, means for calculating one or more second derivatives of temperature with respect to time based on temperature readings, and means for determining whether to perform temperature mitigation on the chip based on the one or more calculated second derivatives of temperature.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Temperature sensors may be integrated on a chip to monitor temperature at various locations on the chip. Temperature readings from the sensors may be fed to a temperature manager that manages circuits (e.g., central processing unit (CPU)) on the chip based on the temperature readings. For example, the temperature manager may manage the circuits based on the temperature readings to prevent thermal runaway. Thermal runaway occurs when increases in temperature cause increases in leakage power, which, in turn, cause further increases in temperature. This positive feedback can cause the temperature of the chip to rapidly rise, potentially damaging the circuit.

A conventional temperature manager compares a temperature reading from a temperature sensor to a temperature threshold (also referred to as temperature set point). If the temperature reading is above the threshold, then the temperature manager takes action to mitigate (reduce) the temperature. For example, the temperature manager may mitigate the temperature by reducing the operating frequency of a circuit on the chip and/or reducing the supply voltage of the circuit. A problem with this approach is that it may not accurately predict the start of thermal runaway on the chip. This may be explained with reference to FIG. 1.

Figure 1:
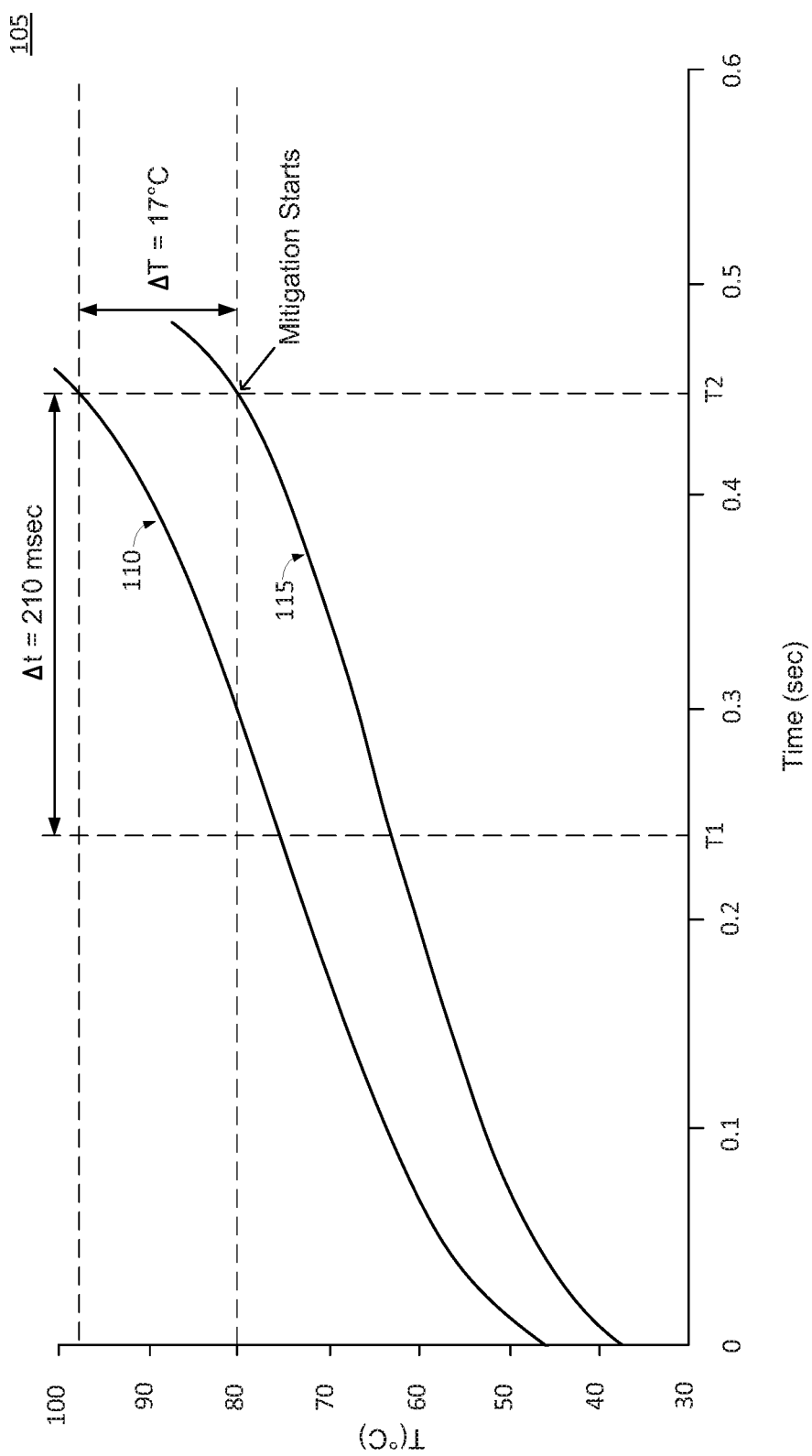
FIG. 1 is a plot showing an example of temperature at a hotspot over time and temperature at a temperature sensor over time.

FIG. 1 is a plot 105 showing the temperature 110 at a hotspot on the chip over time. The hotspot may be located within a CPU (e.g., processor core) on the chip. In this example, the temperature 110 at the hotspot rises due to power dissipation in the CPU. The power dissipation may be due to dynamic power caused by switching activity in the CPU and leakage power caused by subthreshold current leakage in the CPU. At time T1, the CPU enters thermal runaway, which is characterized by a rapid increase in temperature. In this example, thermal runaway starts at the hotspot at a temperature of approximately 75° C.

The plot 105 also shows the temperature 115 sensed by a temperature sensor over time, in which the temperature sensor is integrated on the chip and located near the hotspot. As shown in FIG. 1, the temperature 115 at the temperature sensor is offset from the temperature 110 at the hotspot. In other words, the temperature 115 at the temperature sensor lags the temperature 110 at the hotspot because of the space between the hotspot and temperature sensor. In the example in FIG. 1, the temperature threshold (i.e., temperature at which the temperature manager mitigates temperature) is set to approximately 80° C.

As shown in FIG. 1, there is a relatively long delay of 210 milliseconds between the time T1 at which thermal runaway starts at the hotspot and the time T2 at which the temperature reading of the sensor reaches the temperature threshold due to the temperature offset. Because of the long delay, the temperature manager does not start mitigating temperature until the temperature 110 at the hotspot is 17° C. above the threshold. By then, it may be too late for the temperature manager to stop the thermal runaway. This may be especially true for a mobile device (e.g., mobile phone) because mobile devices typically do not have an active cooling system (e.g., cooling fan). As a result, the temperature manager may not be able to reduce temperature fast enough to stop the thermal runaway.

One approach to prevent thermal runaway in the above example is to lower the temperature threshold to account for temperature offset between the hotspot and temperature sensor. A problem with this approach is that the temperature offset may vary over time. This is because the location of the hotspot on the chip may move while the location of the temperature sensor remains fixed. As a result, the distance between the hotspot and the temperature sensor, and hence the temperature offset, may vary over time. The location of the hotspot may move depending on use case. For example, the location of the hotspot may move as the activity level of different circuits on the chip change over time (e.g., due to changes in the tasks being performed by the chip). Hence, it may be difficult to determine the location of the hotspot, and hence the temperature offset.

In the above approach, the temperature threshold may be set based on the worst-case temperature offset to prevent thermal runaway for the worst-case temperature offset. However, the actual temperature offset may be lower than the worst-case temperature offset. As a result, the temperature threshold may be lower than necessary to prevent thermal runaway, which causes the temperature manager to initiate temperature mitigation sooner than necessary to prevent thermal runaway. Initiating temperature mitigation too early unnecessarily reduces chip performance. This is because temperature mitigation typically involves reducing an operating frequency of the chip, which reduces processing speed. Thus, setting the temperature threshold based on the worst-case temperature offset may result in a loss of chip performance.

In one approach, the temperature threshold may be set to the same temperature across multiple chips. In this example, each chip may be fabricated based on the same or substantially same design. However, subthreshold leakage current may vary from chip to chip due to process variation. As a result, the temperature at which thermal runaway occurs may vary from chip to chip. In this approach, the temperature threshold may be set to a temperature that prevents thermal runaway for a high-leakage chip (a chip that is leakier than most of the chips). This may be done so that the temperature threshold prevents thermal runaway for a majority of the chips. However, a drawback of this approach is that the temperature threshold is overly conservative for less leaky chips, resulting in unnecessary performance loss for these chips. Another drawback is that the leakiest chips (chips for which the temperature threshold is too high to prevent thermal runaway) may be screened out (discarded), resulting in reduced chip yield.

Accordingly, techniques for accurately detecting thermal runaway on a chip are desirable.

Embodiments of the present disclosure accurately detect thermal runaway on a chip by receiving temperature readings from a temperature sensor, calculating the second derivative of temperature with respect to time based on the temperature readings, and comparing the second derivative of temperature to a threshold (e.g., zero). If the second derivative is above the threshold, then temperature mitigation (e.g., by reducing the frequency of a circuit) may be performed to prevent thermal runaway from overheating and damaging the chip, as discussed further below.

Figure 2:
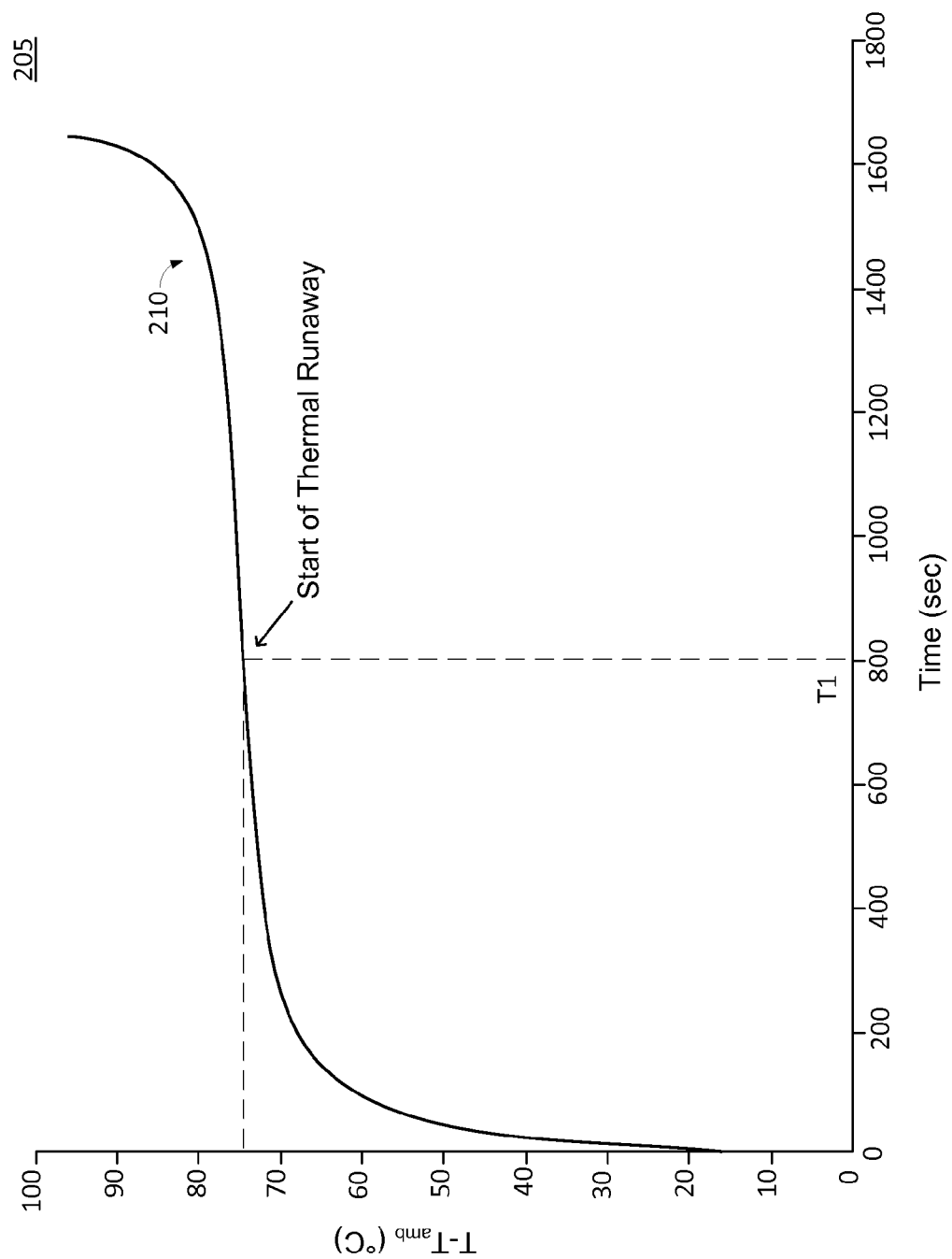
FIG. 2 is a plot showing an example of temperature on a chip over time.
Figure 3:
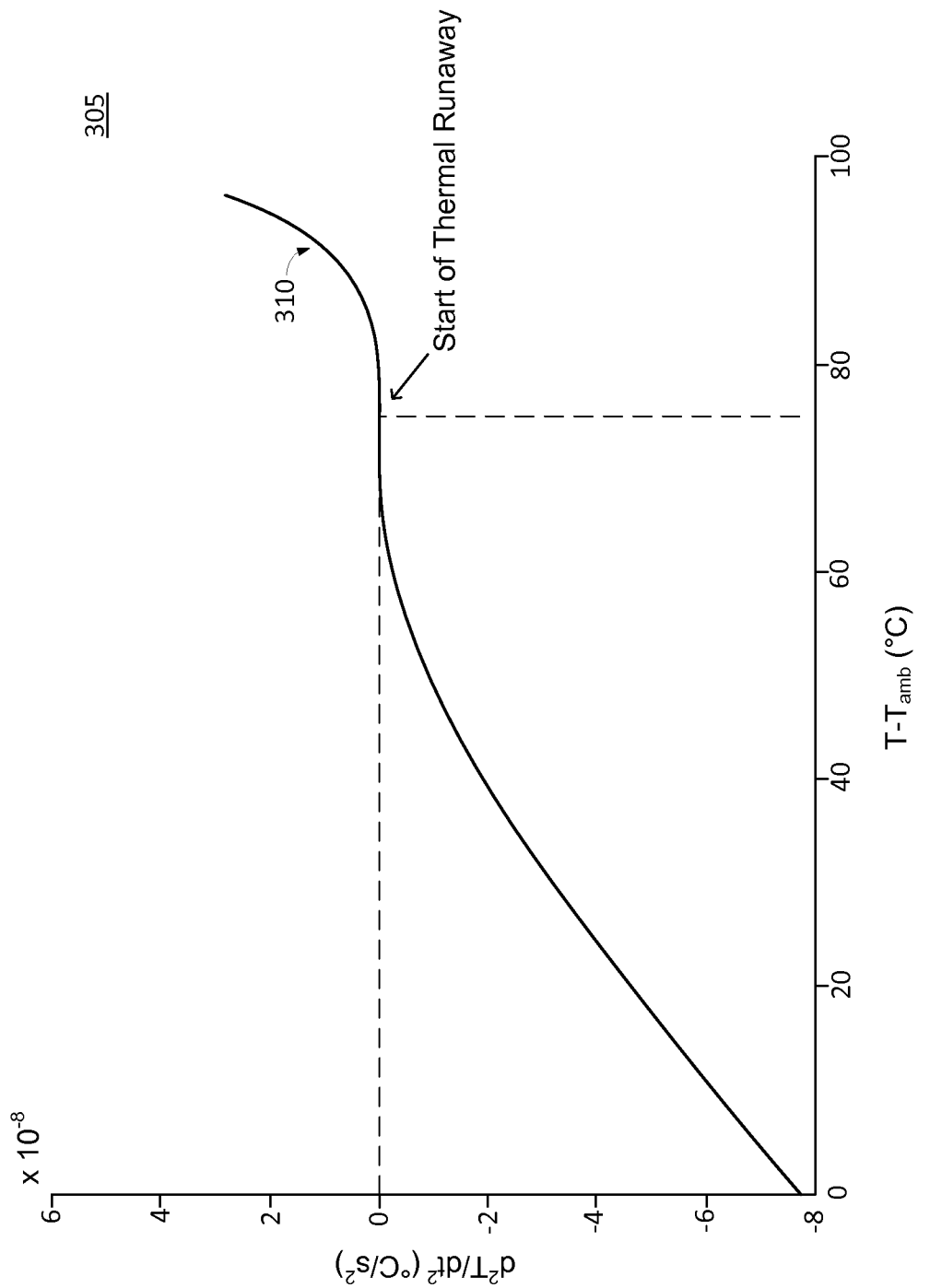
FIG. 3 is a plot showing a second derivative of the temperature in FIG. 2 with respect to time.

Embodiments of the present disclosure may be explained by way of example with reference to FIGS. 2 and 3. FIG. 2 is a plot 205 showing an example of temperature 210 on a chip over time, in which the vertical axis is the temperature above ambient temperature (denoted "$T_{amb}$") and the horizontal axis is time. In this example, the temperature 210 rises due to power dissipation by one or more circuits on the chip (dynamic power dissipation and leakage power dissipation). The ambient temperature may be the temperature of the chip before power dissipation. In this example, the temperature 210 rises from time zero to time T1 due primarily to dynamic power dissipation. The rate of change of the temperature 210 (first derivative of the temperature with respect to time) decreases over time between time zero and time T1. As a result, the slope of the temperature profile (curve) decreases over time between time zero and time T1, as shown in FIG. 2.

At time T1, the chip enters thermal runaway, and the rate of change of the temperature 210 (first derivative of the temperature with respect to time) starts to increase over time due to positive feedback between leakage power and temperature. As a result, the slope of the temperature profile (curve) starts to increase, as shown in FIG. 2. The thermal runaway leads to a rapid rise in the temperature 210, which can overheat and damage the chip if allowed to continue.

FIG. 3 is a plot 305 showing the second derivative of the temperature in FIG. 2 with respect to time (denoted "$d^2T/dt^2$", where T is temperature and t is time). In the plot 305, the vertical axis is the second derivative of the temperature 310 with respect to time and the horizontal axis is the temperature above the ambient temperature (denoted "T$_{amb}$"). As shown in FIG. 3, before the start of thermal runaway, the second derivative of the temperature 310 is negative. This is because the rate of change of the temperature (first derivative of the temperature with respect to time) decreases over time before the start of thermal runaway, as shown in FIG. 2. At the start of thermal runaway, the second derivative of the temperature 310 transitions from negative to positive. This is because the rate of change of the temperature (first derivative of the temperature with respect to time) starts to increase at the start of thermal runaway, as shown in FIG. 2.

Thus, the start of thermal runaway may be detected by detecting the transition of the second derivative of temperature from negative to positive, which, in turn, may be detected by detecting when the second derivative of temperature rises above zero. The detection of thermal runaway is approximately insensitive to variation in subthreshold current leakage caused by process variation. This is because the transition of the second derivative of temperature from negative to positive is an inherent property of thermal runaway. Thus, the second derivative of temperature provides an accurate indicator of thermal runaway across process variation.

Figure 4:
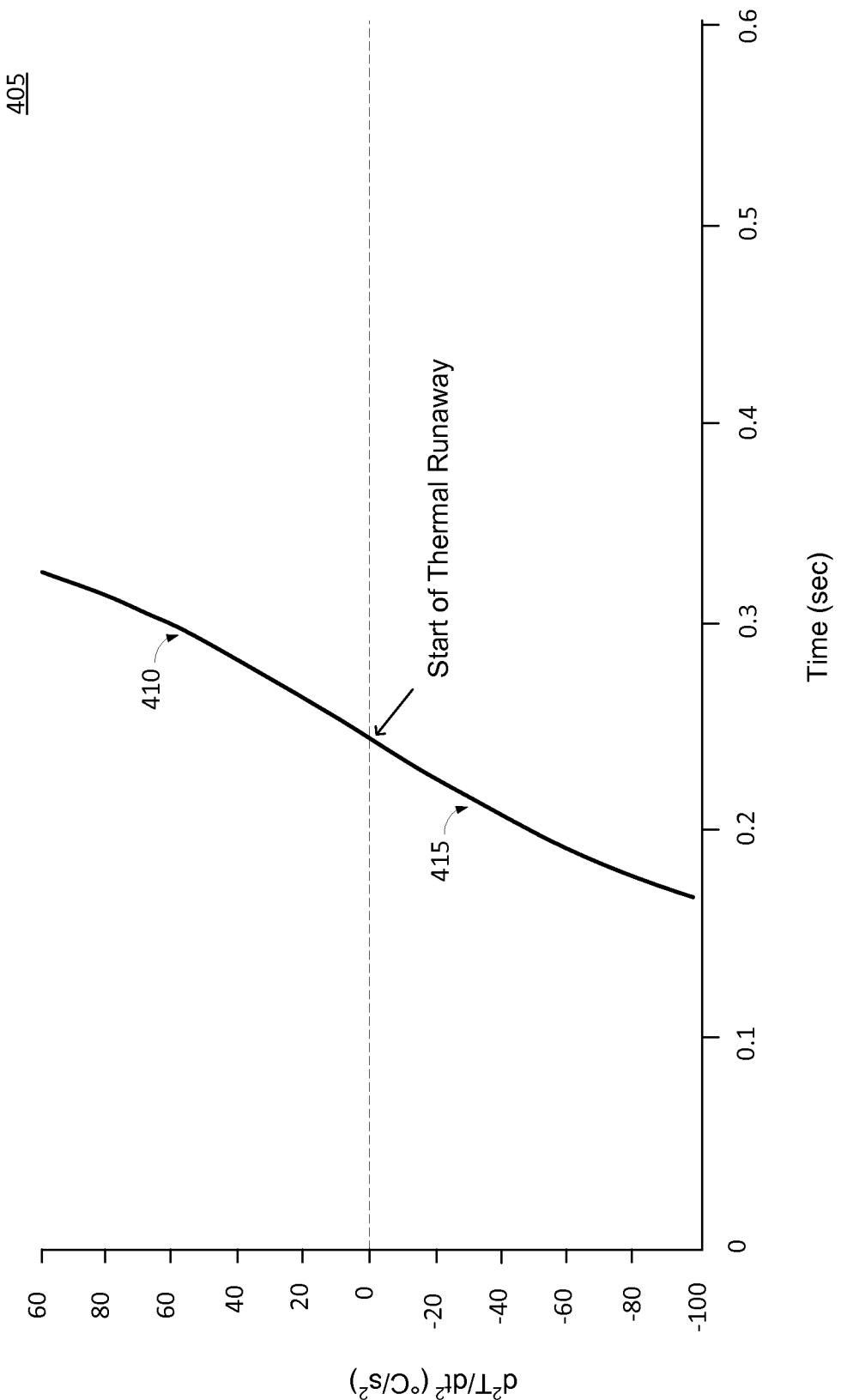
FIG. 4 is a plot showing a second derivative of the hotspot temperature in FIG. 1 with respect to time and a second derivative of the sensor temperature in FIG. 1 with respect to time.

Embodiments of the present disclosure are also approximately insensitive to temperature offset between a hotspot and a temperature sensor used to measure the temperature of the hotspot. In this regard, FIG. 4 is a plot 405 showing the second derivative of the hotspot temperature in FIG. 1 with respect to time and the second derivative of the sensed temperature in FIG. 1 with respect time. As shown in FIG. 4, the second derivative of the sensed temperature 415 is substantially the same as the second derivative of the hotspot temperature 410 due to the short thermal diffusion of silicon. In the time scale shown in FIG. 4, the second derivative of the sensed temperature 415 and the second derivative of the hotspot temperature 410 are approximately indistinguishable. Thus, even though there is a temperature offset between the hotspot and temperature sensor, the second derivative of the sensed temperature 415 transitions from negative to positive at approximately the same time the second derivative of the hotspot temperature 410 transitions from negative to positive. As a result, the second derivative of temperature at the temperature sensor may be used to accurately detect the start of thermal runaway at the hotspot even in the presence of temperature offset.

Therefore, embodiments of the present disclosure are able to accurately detect the start of thermal runaway on a chip across process variation and in the presence of temperature offset. This allows a temperature manager to more accurately determine when to initiate temperature mitigation to prevent chip damage due to thermal runaway. In the conventional approach discussed above (which compares temperature to a temperature threshold), a large margin may be built into the temperature threshold to account for process variation and temperature offset. In most cases, the margin is overly conservative, which causes the temperature manager to mitigate temperature too early, resulting in unnecessary performance loss. In contrast, embodiments of the present disclosure are approximately insensitive to process variation and temperature offset, and therefore do not need a large margin to account for process variation and temperature offset. By increasing the accuracy with which the temperature manager can detect the start of thermal runaway, embodiments of the present disclosure allow the temperature manager to initiate temperature mitigation closer to the start of thermal runaway, and therefore reduce unnecessary performance loss caused by initiating temperature mitigation too early.

Embodiments of the present disclosure may also increase chip yield. As discussed above, in the conventional approach, a fixed temperature threshold is used across chips. This may result in a certain percentage of the chips (chips for which the temperature threshold is too high to prevent thermal runaway) being screened out (discarded). Embodiments of the present disclosure allow a temperature manager on a very leaky chip (a chip that would be screened out using the conventional approach) to accurately detect the start of thermal runaway on the chip, and therefore protect the chip from damage due to thermal runaway. As a result, the very leaky chip need not be discarded, thereby increasing chip yield.

Figure 5:
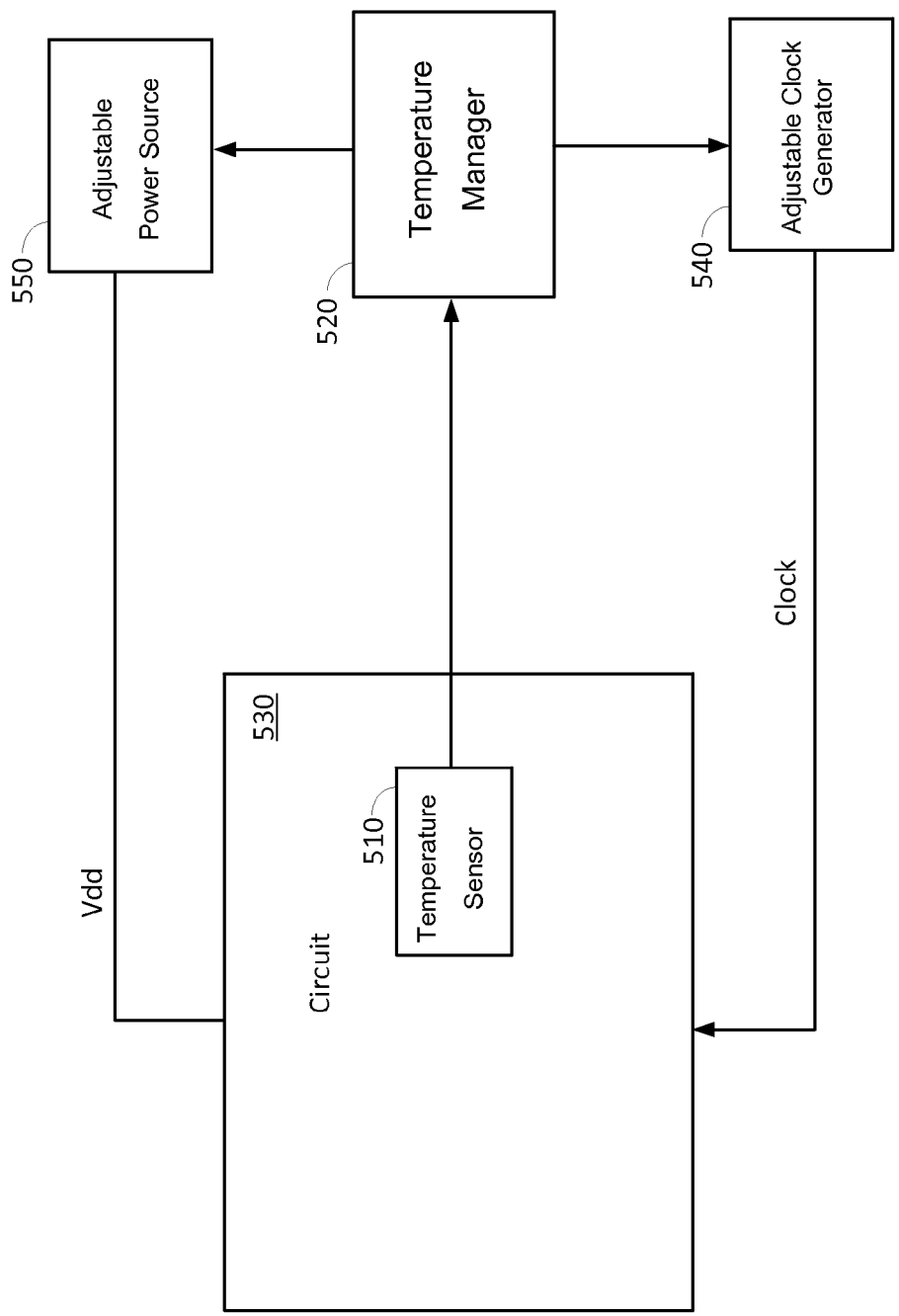
FIG. 5 shows a temperature management system according to an embodiment of the present disclosure.

FIG. 5 shows a temperature management system according to an embodiment of the present disclosure. The temperature management system comprises a temperature sensor 510, a temperature manager 520, an adjustable clock generator 540, and an adjustable power source 550.

The temperature sensor 510 is configured to measure temperature within a circuit 530 (e.g., CPU), and output corresponding temperature readings to the temperature manager 520. The temperature sensor 510 may be integrated in the circuit 530, as shown in FIG. 5. Alternatively, the temperature sensor 510 may be located near the circuit 530 on the same chip.

The adjustable clock generator 540 is configured to generate a clock signal for the circuit 530, and to adjust the frequency of the clock signal under the control of the temperature manager 520. The clock signal is output to the circuit 530 (e.g., CPU), which the circuit 530 may use for switching (toggling) transistors in the circuit 530. In this example, the frequency of the clock signal may correspond to an operating frequency of the circuit 530. Thus, the temperature manager 520 may adjust (scale) the operating frequency of the circuit 530 by adjusting the frequency of the clock signal output from the clock generator 540.

The adjustable power source 550 is configured to provide an adjustable supply voltage (denoted "Vdd") to the circuit 530, and to adjust the supply voltage Vdd under the control of the temperature manager 520. The power source 550 may comprise a power management integrated circuit (PMIC). The circuit 530 may use the supply voltage Vdd to power devices (e.g., transistors) in the circuit 530. Thus, the temperature manager 520 may adjust (scale) the supply voltage of the circuit 530 by adjusting the supply voltage Vdd provided to the circuit 530 from the power source 550.

The temperature manager 520 is configured to calculate a second derivative of temperature with respect to time (i.e., $d^2T/dt^2$) based on temperature readings from the temperature sensor 510. For example, the temperature readings may be digitized at a sampling rate, and the temperature manager 520 may calculate the second derivative of temperature based on the following equation:

$$d^2T/dt^2 = T^{n-2} - 2T^{n-1} + T^n \qquad (1)$$

where T is a temperature reading and n is a sample index. Thus, in this example, the temperature manager 520 calculates the second derivative of temperature based on three consecutive temperature readings. It is to be appreciated that the present disclosure is not limited to this example, and that the temperature manager 520 may calculate the second derivative of temperature using other techniques.

After calculating the second derivative of temperature, the temperature manager 520 may compare the second derivative of temperature to a threshold. In one example, the threshold may be approximately equal to zero to detect the start of thermal runaway in the circuit 530. In another example, the threshold may be slightly lower than zero to initiate temperature mitigation just before the start of thermal runaway. This may allow more time for temperature mitigation to take effect before thermal runway can damage the chip. If the second derivative is above the threshold, then the temperature manager 520 may mitigate (reduce) temperature to prevent damage to the circuit 530 due to thermal runaway.

For example, the temperature manager 520 may mitigate temperature by instructing the adjustable clock generator 540 to reduce the frequency of the clock signal input to the circuit 530, and hence the operating frequency of the circuit 530. This reduces temperature by reducing dynamic power dissipation in the circuit 530 due to switching activity in the circuit 530. The dynamic power dissipation may be approximately proportional to the operating frequency.

In another example, the temperature manager 520 may mitigate temperature by instructing the adjustable power supply 550 to reduce the supply voltage Vdd provided to the circuit 530. This reduces temperature by reducing dynamic power dissipation in the circuit 530, in which the dynamic power may be approximately proportional to the square of the supply voltage. In yet another example, the temperature manager 520 may mitigate temperature by reducing both the operating frequency and supply voltage of the circuit 530.

Although one temperature sensor 510 is shown in FIG. 5 for ease of illustration, it is to be appreciated that the temperature management system may include a plurality of temperature sensors to measure temperature in different regions of the circuit 530. In this example, the temperature manager 520 may calculate a second derivative of temperature with respect to time for each temperature sensor and compare each of the calculated second derivatives to the threshold (e.g., zero). If one of the calculated second derivatives is above the threshold, then the temperature manager 520 may mitigate temperature, as discussed above.

It is also to be appreciated that the temperature management system may include a plurality of temperature sensors to measure temperature of one or more other circuits on the same chip as the circuit 530. In this example, the temperature manager 520 may calculate a second derivative of temperature with respect to time for each temperature sensor and compare each of the calculated second derivatives to the threshold. If one of the calculated second derivatives is above the threshold, then the temperature manager 520 may mitigate temperature. For example, the temperature manager 520 may mitigate temperature by identifying the circuit corresponding to the temperature sensor for which the calculated second derivative of temperature is above the threshold, and reducing the operating frequency and/or supply voltage of the identified circuit. The temperature manager 520 may also reduce the operating frequency and/or supply voltage of a nearby circuit located in close proximity to the identified circuit on the chip. This may enhance temperature mitigation of the identified circuit since heat from the nearby circuit may affect the temperature of the identified circuit.

In some aspects, when the second derivative of temperature is below the threshold, the temperature manger 520 may compare the operating frequency of the circuit 530 to a target frequency. If the operating frequency is below the target frequency, then the temperature manager 520 may increase the operating frequency. For example, the circuit 530 may be below the target frequency because of a previous temperature mitigation. Thus, after the operating frequency is reduced during temperature mitigation, the temperature manager 520 may increase the operating frequency when the temperature falls below the temperature range of thermal runaway to regain performance (e.g., processing speed) lost by the temperature mitigation.

The raw temperature readings from the temperature sensor 510 may be too noisy for the temperature manager 520 to calculate the second derivative of temperature with respect to time directly from the raw temperature readings. The noise may be due to quantization noise caused by digitizing the temperature readings, sensor noise, etc. In this regard, the raw temperature readings may be low passed filter to smooth out the temperature readings, and the temperature manager 520 may calculate the second derivative of temperature with respect to time using the low-pass filtered temperature readings, as discussed further below.

Figure 6:
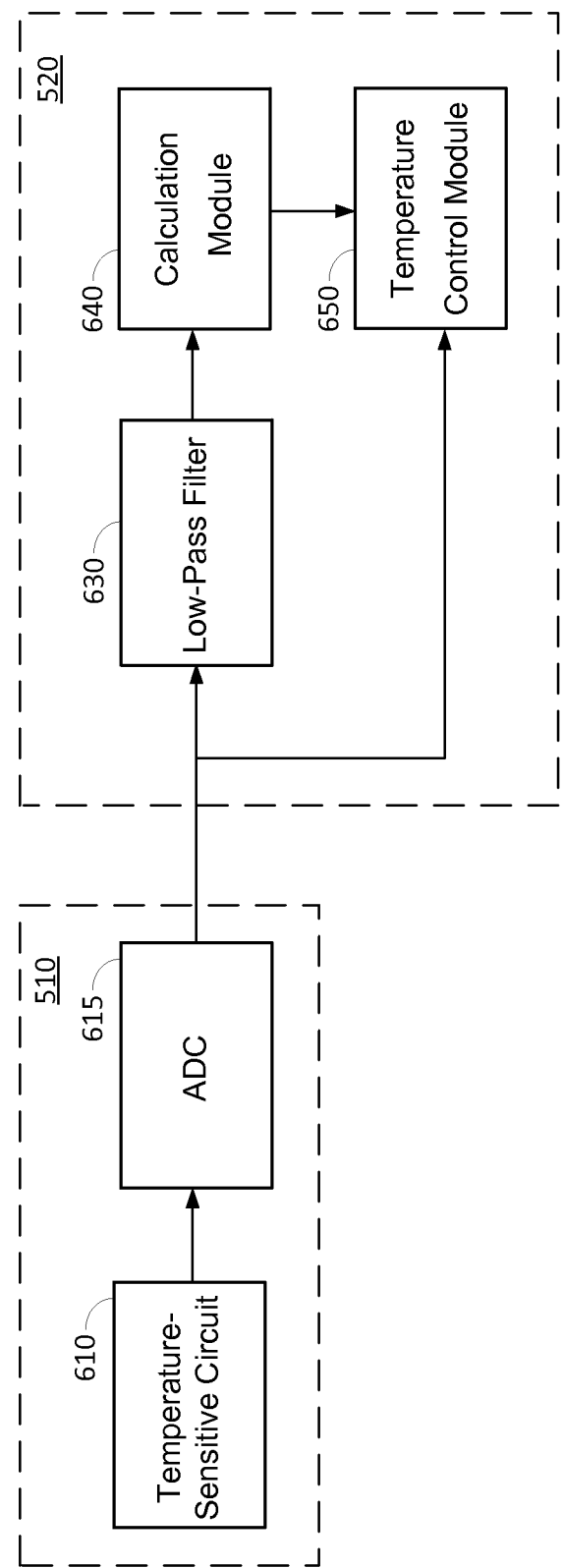
FIG. 6 shows a temperature sensor and a temperature manager according to an embodiment of the present disclosure.

FIG. 6 shows an exemplary implementation of the temperature sensor 510 and the temperature manager 520 according to an embodiment of the present disclosure. In this example, the temperature sensor 510 comprises a temperature-sensitive circuit 610 and an analog-to-digital converter (ADC) 615. The temperature-sensitive circuit 610 is configured to generate a current and/or a voltage that is sensitive to temperature. For example, the temperature-sensitive circuit 610 may generate a current and/or a voltage that is approximately proportional to absolute temperature (i.e., a proportional to absolute temperature (PTAT) current and/or voltage). The ADC 615 is configured to convert the temperature-sensitive (e.g., PTAT) current and/or voltage from the temperature-sensitive circuit 610 into digital temperature readings. For example, the ADC 615 may convert the current and/or the voltage into digital temperature readings at a predetermined sampling rate, and output the digital temperature readings to the temperature manager 520.

In one aspect, the temperature-sensitive circuit 610 and the ADC 615 may both be integrated in the circuit 530 (shown in FIG. 5). Alternatively, the temperature-sensitive circuit 610 may be integrated in the circuit 530 while the ADC 615 may be located outside the circuit 530. In this example, the temperature-sensitive current and/or voltage from the temperature-sensitive circuit 610 may be routed to the ADC 615 by a signal path on the chip.

The temperature manager 520 comprises a low-pass filter 630, a calculation module 640, and a temperature control module 650. The low-pass filter 630 may comprise a low-pass resistor-capacitor (RC) filter implemented in the digital domain or other type of low-pass filter. As discussed above, the raw digital temperature readings from the temperature sensor 510 may be too noisy for the temperature manager 520 to calculate the second derivative of temperature with respect to time directly from the raw temperature readings. The noise may be due to quantization noise from the ADC 615, noise in the temperature-sensitive circuit 610, etc.

Figure 7:
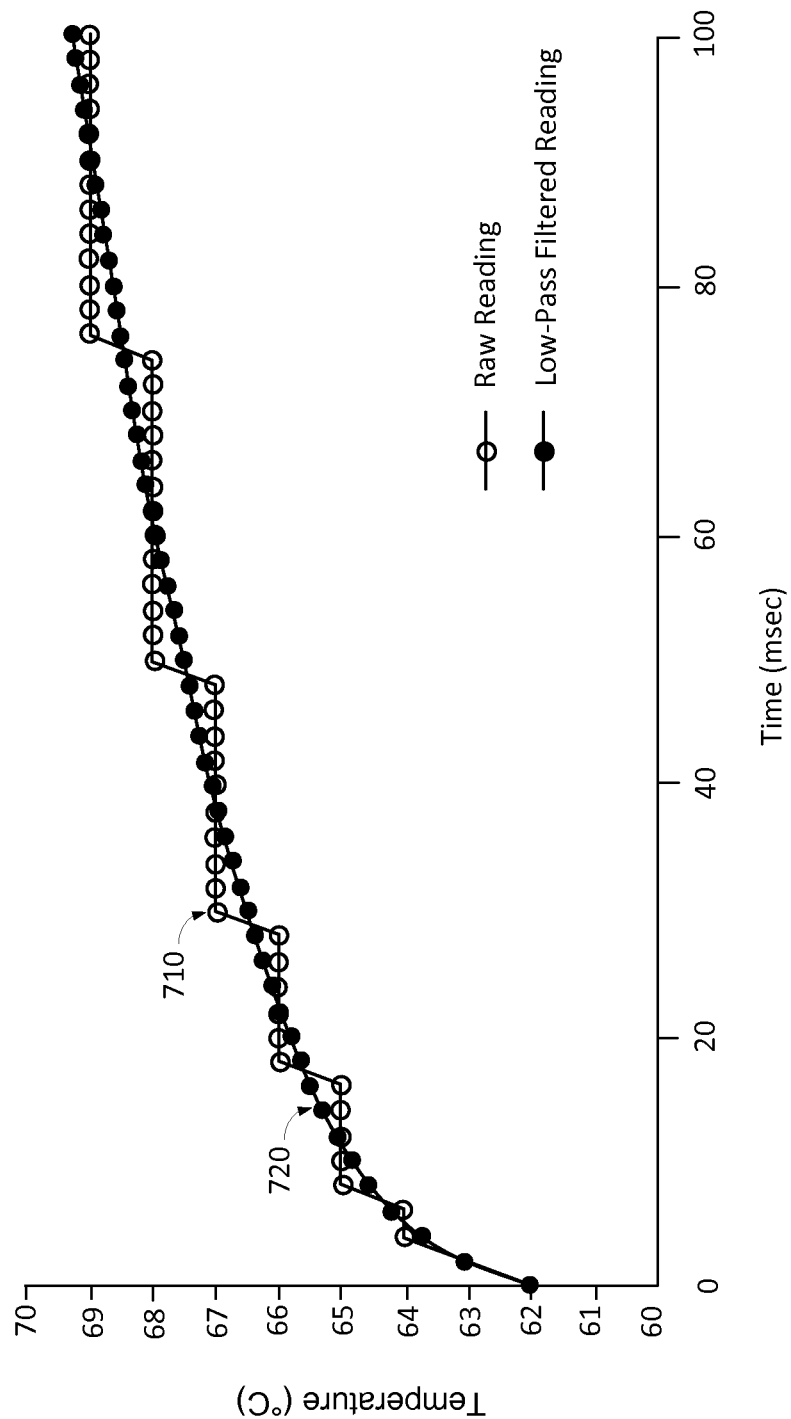
FIG. 7 is a plot showing an example of raw temperature readings and low-pass filtered temperature readings according to an embodiment of the present disclosure.

In this regard, FIG. 7 shows an example of raw digital temperature readings from the temperature sensor 510 and low-pass filtered temperature readings from the low-pass filter 630. In FIG. 7, the raw digital temperature readings are represented by open circles, and the low-pass filtered readings are represented by solid circles. As shown in FIG. 7, the raw digital temperature readings form a temperature profile 710 having relatively large jumps and regions that remain constant over two or more readings between jumps. As a result, the raw digital temperature readings may be unsuitable for calculating a second derivative of temperature with respect to time. In contrast, the low-pass filtered temperature readings form a temperature profile 720 having a relatively smooth curve. As a result, the low-pass filtered temperature readings are more suitable for calculating a second derivative of temperature with respect to time.

Referring back to FIG. 6, the calculation module 640 is configured to receive the low-pass filtered temperature readings from the low-pass filter 630, and calculate a second derivative of temperature with respect to time (i.e., $d^2T/dt^2$) based on the filtered temperature readings. For example, the calculation module 640 may calculate the second derivative of temperature according to equation (1) discussed above.

The temperature control module 650 is configured to receive the second derivative of temperature from the calculation module 640, and determine whether to mitigate temperature based on the second derivative of temperature. For example, the temperature control module 650 may compare the second derivative of temperature to a threshold (e.g., zero). If the second derivative is above the threshold, then the temperature control module 650 may mitigate (reduce) temperature to prevent damage to the circuit 530 due to thermal runaway. For example, the temperature control module 650 may mitigate temperature by instructing the adjustable clock generator 540 to reduce the frequency of the clock signal input to the circuit 530 and/or instructing the adjustable power supply 550 to reduce the supply voltage Vdd provided to the circuit 530.

As discussed above, the low-pass filter 630 may comprise a low-pass RC filter implemented in the digital domain. A low-pass RC filter may be expressed in the Laplace domain as follows:

$$H(s) = \frac{1}{1 + sRC} \quad (2)$$

where H(s) is the frequency response of the low-pass RC filter in the Laplace domain, R is the resistance of the low-pass RC filter, and C is the capacitance of the low-pass RC filter. The frequency response of the low-pas RC filter in equation (2) may be converted to the Z domain as follows:

$$H(z) = H(s)\big|_{s=\frac{2}{T}*\frac{z-1}{z+1}} = \frac{1 + z^{-1}}{\left(1 + \frac{2RC}{T}\right) + \left(1 - \frac{2RC}{T}\right)z^{-1}} \quad (3)$$

where H(z) is the frequency response of the low-pass RC filter in the Z domain, and T is the sampling period for the digital temperature readings (not to be confused with temperature). Equation (3) may be converted to the following equation:

$$y[n] = \frac{x[n] + x[n-1] - \left(1 - \frac{2RC}{T}\right)y[n-1]}{1 + \frac{2RC}{T}} \quad (4)$$

where y[n] is the output of the filter, x[n] is the input of the filter, and n is a sample index.

Figure 8:
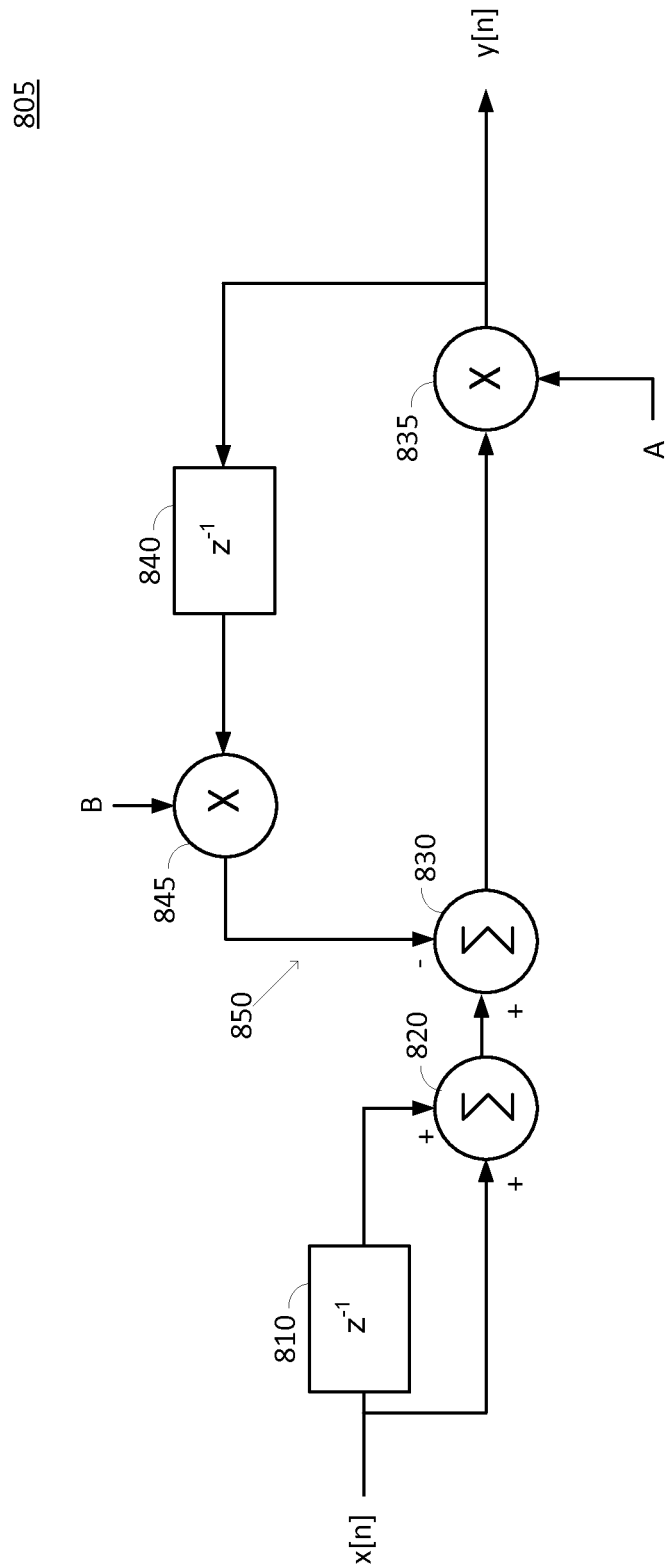
FIG. 8 shows an exemplary implementation of a low-pass filter according to an embodiment of the present disclosure.

In this regard, FIG. 8 shows an exemplary implementation of a low-pass RC filter 805 in the digital domain based on equation (4). The low-pass RC filter 805 may be used to implement the low-pass filter 630 in FIG. 6, in which the input of the filter 805 receives digital temperature readings from the ADC 615 and the output of the filter 805 provides the low-pass filtered temperature readings to the calculation module 640. In the example in FIG. 8, the low-pass RC filter 805 comprises a first delay element 810, a second delay element 840, a summation element 820, a subtraction element 830, a first multiplier 835, and a second multiplier 845. The second delay element 840 and the second multiplier 845 are coupled between the output of the filter and the subtraction element 830 to form a feedback loop 850, as discussed further below.

In operation, the first delay element 810 delays the input x[n] by one sample period to obtain delayed input x[n−1], and the summation element 820 adds the delayed input x[n−1] to the input x[n]. The summation element 820 outputs the resulting sum to the subtraction element 830. The subtraction element 830 subtracts the output of the feedback loop 850 from the output of the summation element 820. The first multiplier 835 multiples the output of the subtraction element 830 by the coefficient A, which may be given by:

$$A = \frac{1}{1 + \frac{2RC}{T}}. \quad (5)$$

The output of the first multiplier 835 provides the output y[n] of the filter 805. The output of y[n] of the filter 805 is fed back to the feedback loop 850, where the second delay element 840 delays the output y[n] by one sample period to obtain delayed output y[n−1], and the second multiplier 845 multiples the delayed output y[n−1] by the coefficient B, which may be given by:

$$B = 1 - \frac{2RC}{T}. \quad (6)$$

The output of the second multiplier 845 provides the output of the feedback loop 850, which the subtraction element 830 subtracts from the output of the summation element 820, as discussed above.

It is to be appreciated that the low-pass filter 805 is a digital implementation of a low-pass RC filter, in which the RC time constant of the filter 805 is implemented using coefficients A and B instead of a physical resistor and physical capacitor. In one aspect, the coefficients A and B may be programmable to provide programmable control over the RC time constant of the filter 805, and hence programmable control over the bandwidth of the filter 805.

There may be a tradeoff between reducing noise in the digital temperature readings from the ADC 615 and increasing the response time of the temperature manager 520. This is because reducing the bandwidth of the filter 805 increases noise reduction at the expense of increasing the response time of the temperature manager 520, which increases the time needed for the temperature manager 520 to detect and respond to thermal runaway. In one aspect, the bandwidth of the filter 805 may be adjusted (tuned) to a bandwidth that provides both sufficient noise reduction to calculate the second derivative of temperature and sufficient response time to stop thermal runaway. For example, the bandwidth of the filter 805 may be programmed (tuned) to be approximately equal to ⅕ the sampling frequency of the ADC 615.

Figure 9:
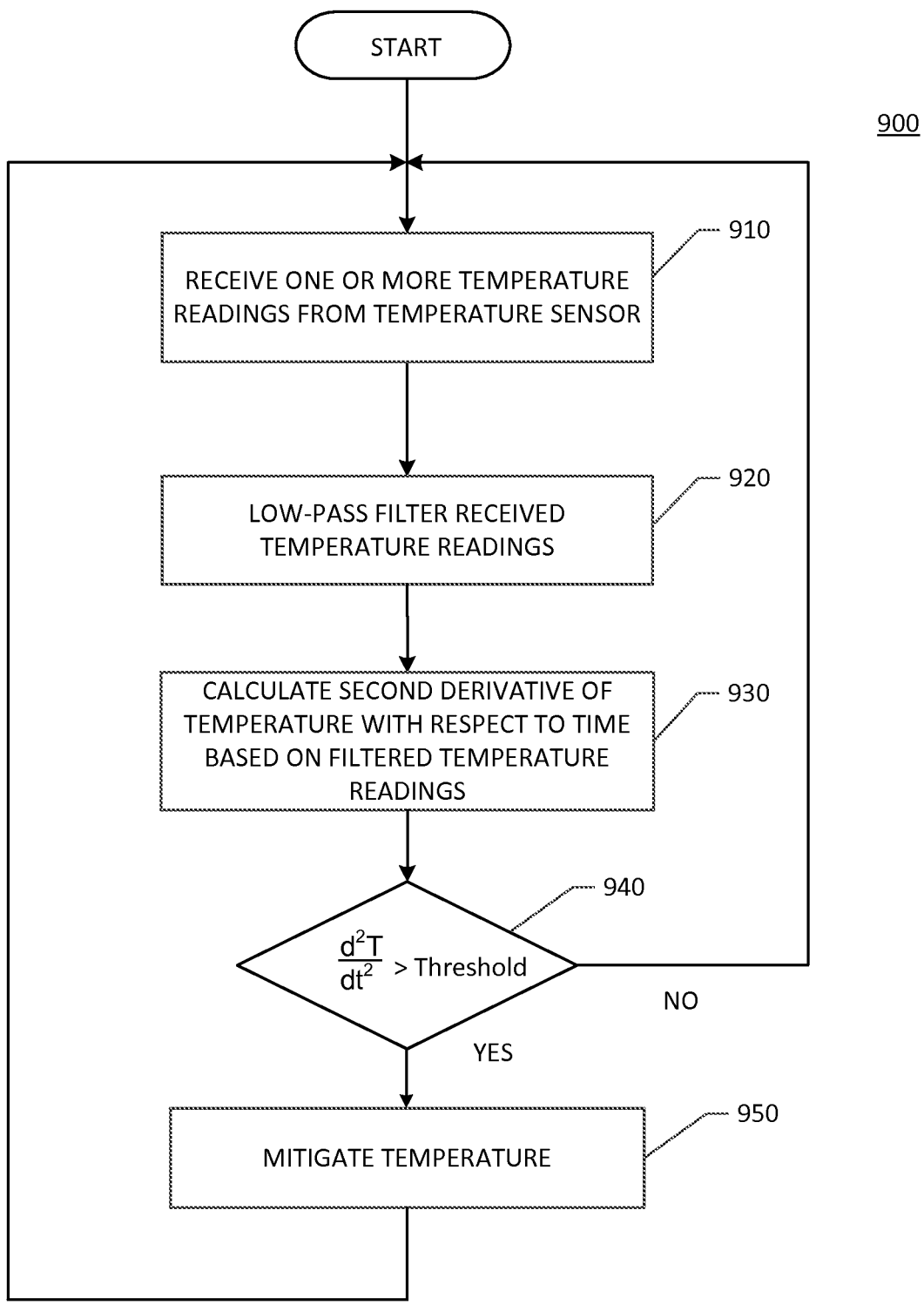
FIG. 9 is a flowchart of a method of temperature control according to an embodiment of the present disclosure.

FIG. 9 is a flowchart illustrating a method 900 of temperature control according to an embodiment of the present disclosure. The method 900 may be performed by the temperature manager 520.

In step 910, one or more temperature readings are received from a temperature sensor. For example, the temperature readings may comprise digital temperature readings from the temperature sensor (e.g., temperature sensor 510), in which temperature sensor measures temperature of a circuit (e.g., circuit 530).

In step 920, the received temperature readings are low-pass filtered. For example, the temperature readings may be low-pass filtered using a low-pass filter (e.g., low-pass filter 630).

In step 930, a second derivative of temperature with respect to time is calculated based on the filtered temperature readings. For example, the second derivative of temperature may be calculated using a calculation module (e.g., calculation module 640). The second derivative may be calculated based on equation (1), in which three consecutive filtered temperature readings may be used to calculate the second derivative of temperature.

In step 940, the second derivative of temperature (i.e., $d^2T/dt^2$) is compared to a threshold. The threshold may be approximately equal to zero to detect thermal runaway, as discussed above. For example, a determination may be made that the circuit 530 is in thermal runaway if the second derivative of temperature is above a threshold of zero (i.e., the second derivative is positive). If the second derivative of temperature is not above the threshold, then the method 900 returns to step 910. If the second derivative of temperature is above the threshold, then the method 900 proceeds to step 950.

In step 950, temperature is mitigated. For example, the temperature of the circuit 530 may be mitigated by reducing an operating frequency of the circuit 530 and/or reducing a supply voltage of the circuit 530. After temperature mitigation, the method 900 may return to step 910.

In some cases, the second derivative of temperature may temporarily rise above zero due to a sudden increase in the dynamic power of the circuit 530 instead of thermal runaway. For example, a sudden increase in dynamic power may be caused by a sudden load change and/or sudden change in activity of the circuit 530. To distinguish between a sudden increase in dynamic power (which may have a short duration) and thermal runaway, the temperature control module 650 may compare the second derivative of temperature to the threshold over a filter time window, and mitigate temperature if the second derivative is above the threshold over the filter time window. The filter time window may be greater than the duration of a sudden increase in dynamic power in order to filter out a temporary rise in the second derivative of temperature above zero due to the sudden increase in dynamic power.

In one aspect, the temperature control module 650 may periodically receive a calculated second derivative of temperature from the calculation module 640. For example, the calculation module 640 may calculate a second derivative of temperature each time a filtered temperature reading is received from the low-pass filter 630. In this example, each second derivative may be calculated based on the three most-recent filtered temperature readings using equation (1). In this aspect, in order to distinguish between a sudden increase in dynamic power and thermal runaway, the temperature control module 650 may compare each one of a plurality of calculated second derivatives from the calculation module 640 to the threshold, and mitigate temperature if all of the calculated second derivatives are above the threshold (e.g., zero). The plurality of calculated second derivatives may be consecutive and may span a time duration equal to the filter time window discussed above.

Accordingly, in one embodiment, step 940 in FIG. 9 may be modified to compare each one of a plurality of calculated second derivatives to the threshold. If all of the calculated second derivatives are above the threshold, then the method 900 may proceed to step 950. If one or more of the calculated second derivatives are not above the threshold, then the method may return to step 910.

In one embodiment, the temperature control module 650 may monitor the dynamic power of the circuit 530 using a digital power meter, which may be implemented on the same chip as the circuit 530. The digital power meter may estimate the dynamic power of the circuit 530 using activity counters that count the number instructions being executed by circuit 530 (e.g., CPU). In this embodiment, the power meter may periodically output an estimate of the dynamic power to the temperature control module 650. The temperature control module 650 may calculate a first derivative of the dynamic power based on two dynamic power estimates as follows:

$$dP_{dyn}/dt = P^n - P^{n-1} \quad (7)$$

where P is dynamic power and n is a sample index. Thus, the temperature control module 650 may calculate the first derivative of dynamic power by subtracting the previous dynamic power estimate from the current dynamic power estimate. In this embodiment, the temperature control module 650 may detect a sudden increase in dynamic power when the calculated first derivative of dynamic power is above zero.

Thus, the temperature control module 650 may use the power meter to detect a sudden increase in dynamic power. The temperature control module 650 may use this information to determine whether a rise in the second derivative of temperature above the threshold (e.g., zero) is due to a sudden increase in dynamic power or thermal runaway. For example, if the temperature control module 650 detects an increase in dynamic power (i.e., $dP_{dyn}/dt > 0$), then the temperature control module 650 may determine that the rise in the second derivative of temperature above the threshold is due to a sudden increase in dynamic power and not initiate temperature mitigation. If the temperature control module 640 does not detect an increase in dynamic power (i.e., $dP_{dyn}/dt \leq 0$), then the temperature control module 640 may determine that the rise in the second derivative of temperature is due to thermal runaway and initiate thermal mitigation.

Figure 10:
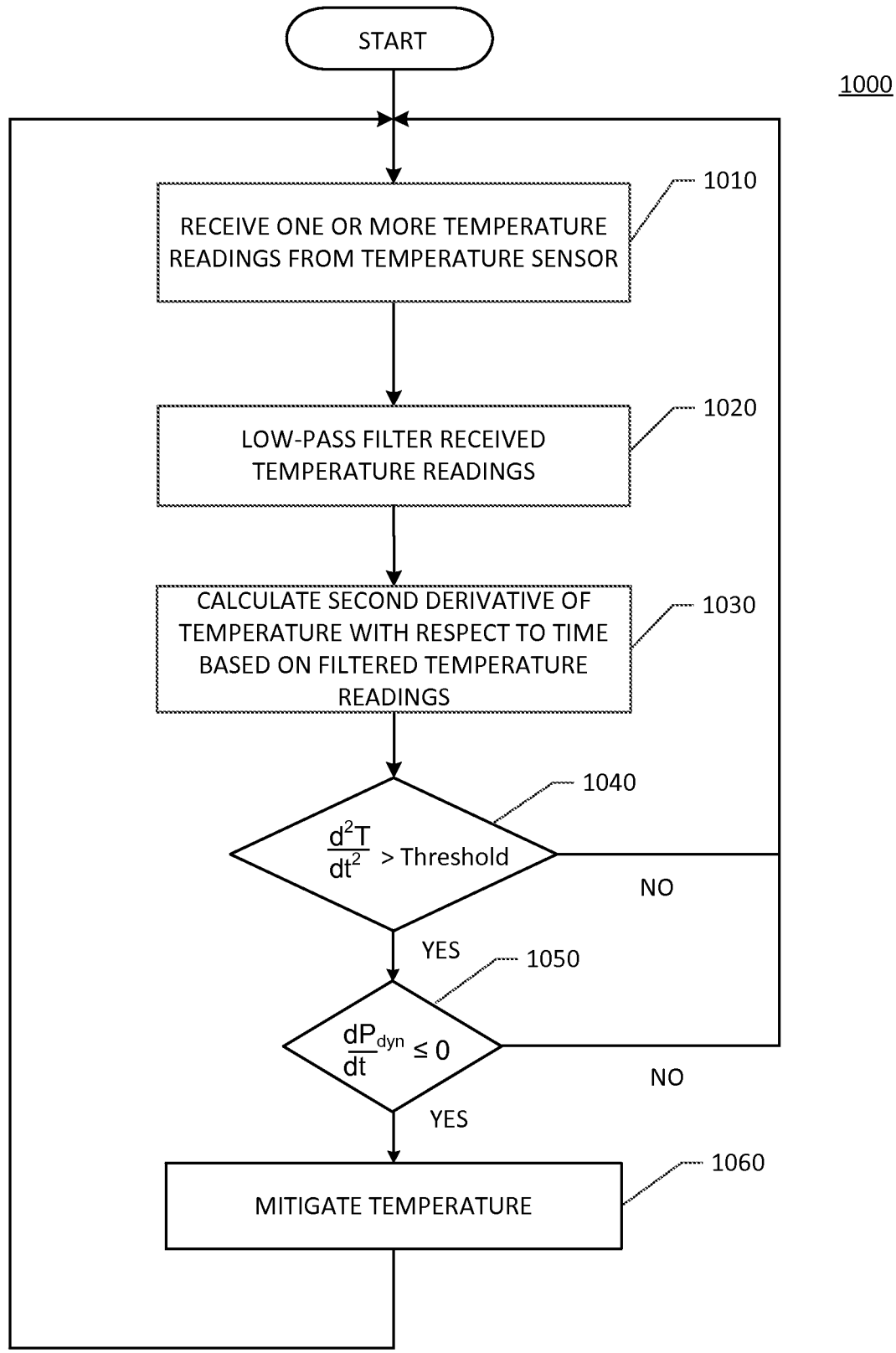
FIG. 10 is a flowchart of a method of temperature control according to another embodiment of the present disclosure.

FIG. 10 is a flowchart illustrating a method 1000 of temperature control according to another embodiment of the present disclosure. The method 1000 may be performed by the temperature manager 520.

In step 1010, one or more temperature readings are received from a temperature sensor. For example, the temperature readings may comprise digital temperature readings from the temperature sensor (e.g., temperature sensor 510). In step 1020, the received temperature readings are low-pass filtered. In step 1030, a second derivative of temperature with respect to time is calculated based on the filtered temperature readings. For example, the second derivative of temperature may be calculated using a calculation module (e.g., calculation module 640).

In step 1040, the second derivative of temperature (i.e., $d^2T/dt^2$) is compared to a threshold. The threshold may be approximately equal to zero to detect thermal runaway, as discussed above. If the second derivative of temperature is not above the threshold, then the method 1000 returns to step 1010. If the second derivative of temperature is above the threshold, then the method 1000 proceeds to step 1050.

In step 1050, a determination is made whether a first derivative of dynamic power ($dP_{dyn}/dt$) is equal to or less than zero. If the first derivative of dynamic power is equal to or less than zero, then the method 1000 proceeds to step 1060. Otherwise, the method 1000 returns to step 1010.

In step 1060, temperature is mitigated. For example, the temperature of the circuit 530 may be mitigated by reducing an operating frequency of the circuit 530 and/or reducing a supply voltage of the circuit 530. After temperature mitigation, the method 1000 may return to step 1010.

Figure 11:
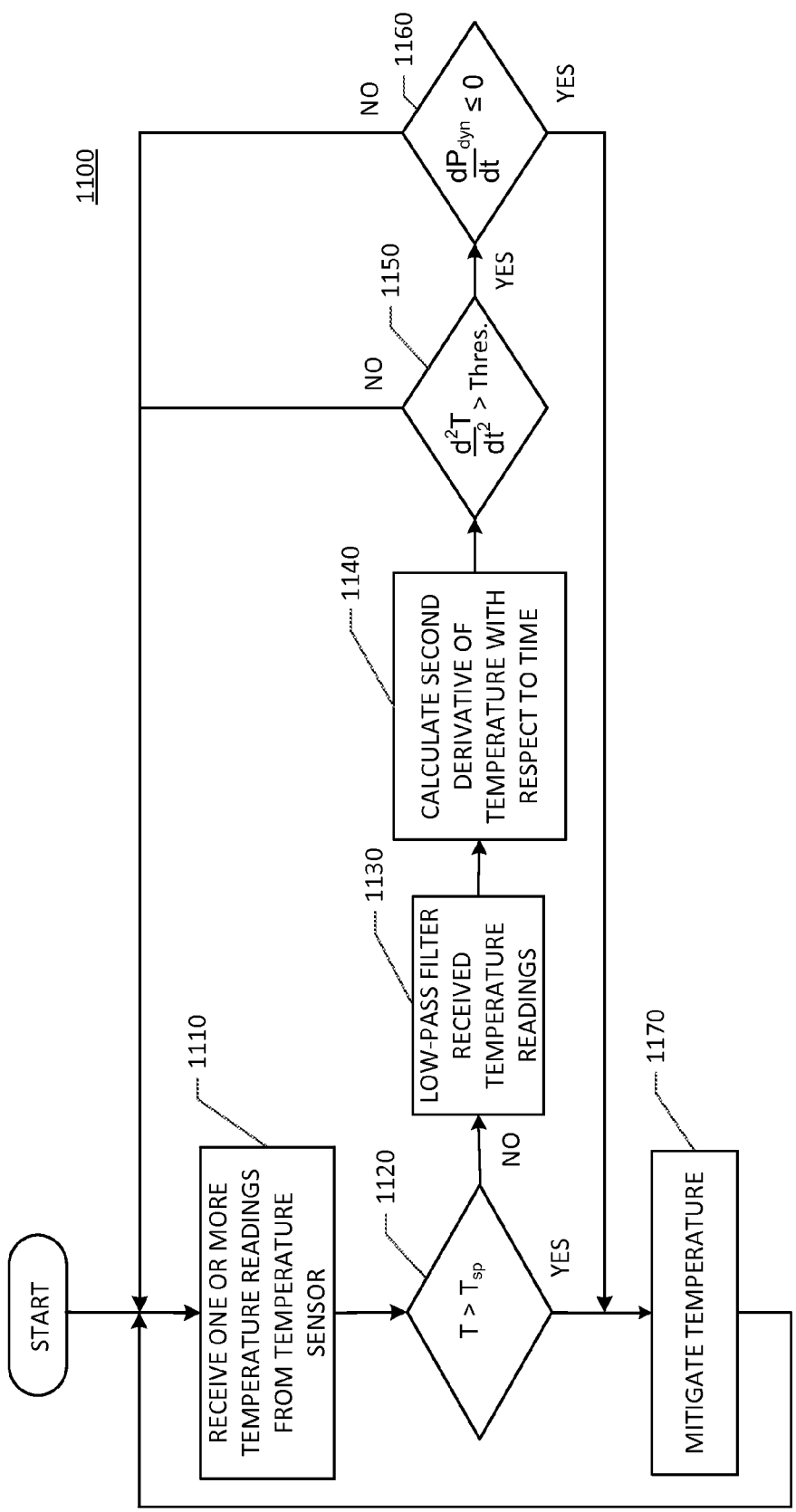
FIG. 11 is a flowchart of a method of temperature control according to still another embodiment of the present disclosure.

As discussed above, in the conventional approach, temperature control is performed by comparing a temperature reading to a temperature threshold (also referred to as temperature set point), and performing temperature mitigation if the temperature reading is above the temperature threshold. In one aspect, embodiments of the present disclosure may be used in combination with the conventional approach. In this regard, FIG. 11 illustrates a method 1100 of temperature control in which embodiments of the present disclosure are used in combination with the conventional approach. The method 1100 may be performed by the temperature manager 520.

In step 1110, one or more temperature readings are received from a temperature sensor. For example, the temperature readings may comprise digital temperature readings from the temperature sensor (e.g., temperature sensor 510).

In step 1120, the current temperature reading is compared to a temperature threshold (denoted "$T_{SP}$"). If the temperature reading is above the temperature threshold, then the method 1100 performs temperature mitigation in step 1170. Otherwise, the method 1100 proceeds to step 1130. The temperature threshold may be set to a higher temperature than that used in the conventional approach. This is because protection from thermal runaway is provided by steps 1130 to 1160 (discussed below), whereas the conventional approach may build a large margin into the temperature threshold to protect against thermal runaway.

In step 1130, the received temperature readings are low-pass filtered. In step 1140, a second derivative of temperature with respect to time is calculated based on the filtered temperature readings. For example, the second derivative of temperature may be calculated using a calculation module (e.g., calculation module 640).

In step 1150, the second derivative of temperature (i.e., $d^2T/dt^2$) is compared to a threshold. The threshold may be approximately equal to zero to detect thermal runaway, as discussed above. If the second derivative of temperature is not above the threshold, then the method 1100 returns to step 1110. If the second derivative of temperature is above the threshold, then the method 1100 proceeds to step 1160.

In step 1160, a determination is made whether a first derivative of dynamic power ($dP_{dyn}/dt$) is equal to or less than zero. If the first derivative of dynamic power is equal to or less than zero, then the method 1100 proceeds to step 1170. Otherwise, the method 1100 returns to step 1110.

In step 1170, temperature is mitigated. For example, the temperature of the circuit 530 may be mitigated by reducing an operating frequency of the circuit 530 and/or reducing a supply voltage of the circuit 530. After temperature mitigation, the method 1100 may return to step 1110.

In one embodiment, the method 1100 may be modified to not perform steps 1130 to 1160 unless the current temperature reading is above a certain temperature. This is because the circuit 530 may not be at risk of thermal runaway when the temperature is below a certain value.

Figure 12:
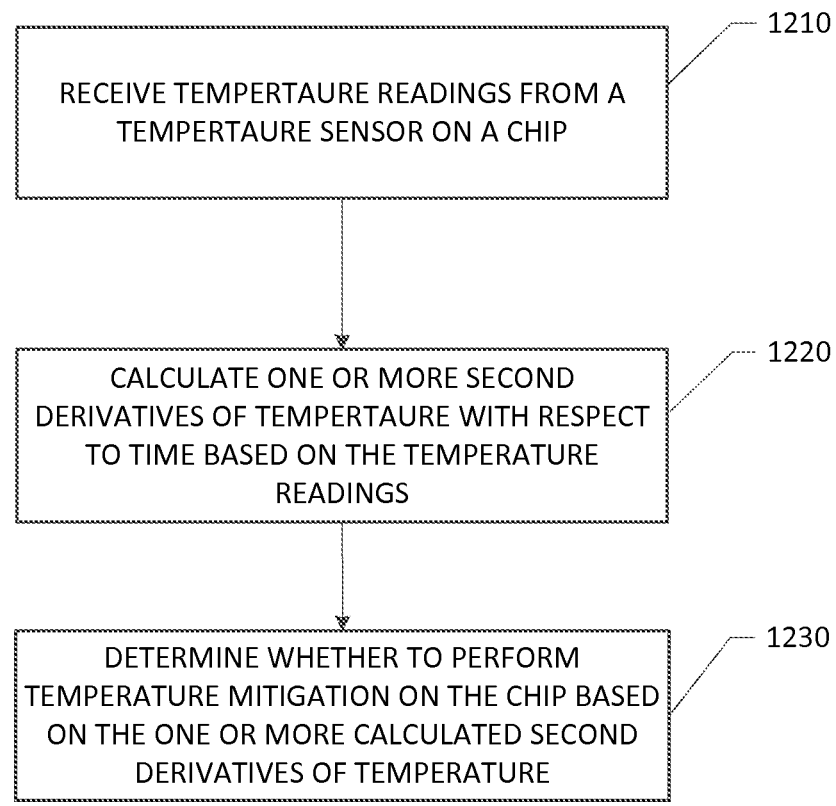
FIG. 12 is a flowchart of a method of temperature control according to yet another embodiment of the present disclosure.

FIG. 12 is a flowchart illustrating a method 1200 of temperature control according to an embodiment of the present disclosure. The method 1200 may be performed by the temperature manager 520.

In step 1210, temperature readings are received from a temperature sensor on a chip. For example, the temperature readings may be received from a temperature sensor (e.g., temperature sensor 510) integrated on the chip. The temperature sensor may be located near a hotspot on the chip.

In step 1220, one or more second derivatives of temperature with respect to time are calculated based on the temperature readings. For example, a second derivative of temperature may be calculated based on equation (1).

In step 1230, a determination is made whether to perform temperature mitigation on the chip based on the one or more calculated second derivatives of temperature. For example, the determination may be made by comparing the one or more calculated second derivatives of temperature to a threshold. The threshold may be approximately equal to zero to detect thermal runaway on the chip. The temperature mitigation may be performed on the chip by reducing an operating frequency of a circuit on the chip and/or reducing a supply voltage of the circuit on the chip. This mitigates (reduces) temperature by reducing the dynamic power of the circuit.

The low-pass filter 630, the calculation module 640, and the temperature control module 650 according to any of the embodiments discussed above may be implemented with a general-purpose processor, a digital signal processor (DSP), an application specific integrated circuit (ASIC), a field programmable gate array (FPGA) or other programmable logic device, discrete hardware components, or any combination thereof designed to perform the functions described herein. A general-purpose processor may be a microprocessor, but in the alternative, the processor may be any conventional processor, controller, microcontroller, or state machine. A processor may perform the functions described herein by executing software comprising code for performing the functions. The software may be stored on a computer-readable storage medium, such as a RAM, a ROM, an EEPROM, an optical disk, and/or a magnetic disk. Implementing the low-pass filter 630, the calculation module 640, and the temperature control module 650 in hardware may have an advantage of faster response time compared with a software implementation, and therefore may provide better protection from thermal runaway.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A temperature management system, comprising:
 a low-pass filter configured to low-pass filter temperature readings from a temperature sensor on a chip to obtain filtered temperature readings;
 a calculation module configured to calculate second derivatives of temperature with respect to time based on the filtered temperature readings; and
 a temperature control module configured to detect a start of thermal runaway on the chip by detecting a transition of the calculated second derivatives of temperature from a negative value to a positive value and to determine to perform temperature mitigation on the chip if the start of thermal runaway is detected, wherein, if a determination is made to perform temperature mitigation, then the temperature control module is configured to reduce at least one of an adjustable clock frequency of a clock signal provided to a circuit on the chip and an adjustable supply voltage provided to the circuit on the chip.

2. The system of claim 1, wherein the temperature sensor is configured to generate a voltage or a current that is sensitive to a temperature of the chip, and to generate the temperature readings based on the voltage or the current.

3. The system of claim 1, wherein the temperature control module is configured to receive dynamic power estimates for the circuit on the chip from a power meter, to determine whether there is an increase in a dynamic power of the circuit based on the dynamic power estimates, and to determine whether to perform temperature mitigation based also on the determination of whether there is an increase in the dynamic power of the circuit.

4. The system of claim 3, wherein the temperature control module is configured to determine an increase in the dynamic power of the circuit if a current one of the received dynamic power estimates is greater than a previous one of the received dynamic power estimates.

5. A method of temperature control, comprising:
receiving temperature readings from a temperature sensor on a chip;
low-pass filtering the temperature readings to obtained filtered temperature readings;
calculating second derivatives of temperature with respect to time based on the filtered temperature readings;
detecting a start of thermal runaway on the chip by detecting a transition of the calculated second derivatives of temperature from a negative value to a positive value;
determining to perform temperature mitigation on the chip if the start of thermal runaway is detected; and
if a determination is made to perform temperature mitigation, then reducing at least one of an adjustable clock frequency of a clock signal provided to a circuit on the chip and an adjustable supply voltage provided to the circuit on the chip.

6. The method of claim 5, further comprising:
receiving dynamic power estimates for the circuit on the chip; and
determining whether there is an increase in a dynamic power of the circuit based on the dynamic power estimates;
wherein determining whether to perform temperature mitigation is based also on the determination of whether there is an increase in the dynamic power of the circuit.

7. The method of claim 6, wherein determining whether there is an increase in the dynamic power of the circuit comprises determining there is an increase in the dynamic power of the circuit if a current one of the received dynamic power estimates is greater than a previous one of the received dynamic power estimates.

8. The system of claim 1, wherein:
the system comprises a clock generator configured to output the clock signal with the adjustable clock frequency to the circuit on the chip; and
the temperature control module is configured to instruct the clock generator to reduce the clock frequency if the determination is made to perform temperature mitigation.

9. The system of claim 1, wherein:
the system comprises a power source configured to provide the adjustable supply voltage to the circuit on the chip; and
the temperature control module is configured to instruct the power source to reduce the supply voltage if the determination is made to perform temperature mitigation.

10. The system of claim 1, wherein if the determination is made to perform temperature mitigation, then the temperature control module is configured to reduce both the clock frequency and the supply voltage.

11. The system of claim 1, wherein:
the system comprises a clock generator configured to output the clock signal with the adjustable clock frequency to the circuit on the chip;
the system comprises a power source configured to provide the adjustable supply voltage to the circuit on the chip; and
if the determination is made to perform temperature mitigation, then the temperature control module is configured to:
instruct the clock generator to reduce the clock frequency; and
instruct the power source to reduce the supply voltage.

12. The method of claim 5, wherein reducing at least one of the adjustable clock frequency of the clock signal provided to the circuit on the chip and the adjustable supply voltage provided to the circuit on the chip comprises reducing both the clock frequency and the supply voltage.

13. A temperature management system, comprising:
a temperature sensor configured to generate temperature readings on a chip; and
a temperature manager configured to receive the temperature readings from the temperature sensor and dynamic power estimates for a circuit on the chip, to determine whether there is an increase in a dynamic power of the circuit based on the dynamic power estimates, to detect a start of thermal runaway on the chip based on the temperature readings and the determination of whether there is an increase in the dynamic power of the circuit, and, if the temperature manager detects the start of thermal runaway, to reduce at least one of an adjustable clock frequency of a clock signal provided to a circuit on the chip and an adjustable supply voltage provided to the circuit on the chip.

14. The system of claim 13, wherein the temperature manager is configured to detect the start of thermal runaway by determining a second derivative of temperature with respect to time based on the temperature readings, comparing the determined second derivative to a threshold, and detecting the start of thermal runaway based on the comparison.

15. The system of claim 13, wherein:
the system comprises a clock generator configured to output the clock signal with the adjustable clock frequency to the circuit on the chip; and
the temperature manager is configured to instruct the clock generator to reduce the clock frequency if the determination is made to perform temperature mitigation.

16. The system of claim 13, wherein:
the system comprises a power source configured to provide the adjustable supply voltage to the circuit on the chip; and the temperature manager is configured to instruct the power source to reduce the supply voltage if the determination is made to perform temperature mitigation.

17. The system of claim 13, wherein if the determination is made to perform temperature mitigation, then the temperature manager is configured to reduce both the clock signal and the supply voltage.

18. The system of claim 13, wherein:
the system comprises a clock generator configured to output the clock signal with the adjustable clock frequency to the circuit on the chip;
the system comprises a power source configured to provide the adjustable supply voltage to the circuit on the chip; and
if the determination is made to perform temperature mitigation, then the temperature manager is configured to:
  instruct the clock generator to reduce the clock frequency; and
  instruct the power source to reduce the supply voltage.

19. The system of claim 13, wherein the temperature manager is configured to determine an increase in the dynamic power of the circuit if a current one of the dynamic power estimates is greater than a previous one of the dynamic power estimates.

20. The system of claim 14, wherein the temperature manager is configured to detect the start of thermal runaway if the second derivative of temperature is greater than the threshold and the temperature manager does not determine an increase in the dynamic power of the circuit.

* * * * *